United States Patent
Viollet et al.

(10) Patent No.: US 10,724,448 B2
(45) Date of Patent: Jul. 28, 2020

(54) MULTI-FUEL INTERNAL COMBUSTION ENGINES AND METHODS FOR THEIR OPERATION

(71) Applicant: Saudi Arabian Oil Company, Dhahran (SA)

(72) Inventors: Yoann Viollet, Dhahran (SA); Junseok Chang, Dhahran (SA); Amer Ahmed Amer, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 94 days.

(21) Appl. No.: 16/017,494

(22) Filed: Jun. 25, 2018

(65) Prior Publication Data
US 2019/0390615 A1 Dec. 26, 2019

(51) Int. Cl.
*F02D 19/06* (2006.01)
*F02M 43/04* (2006.01)
*F02M 61/14* (2006.01)

(52) U.S. Cl.
CPC ..... *F02D 19/0649* (2013.01); *F02D 19/0615* (2013.01); *F02D 19/0689* (2013.01);
(Continued)

(58) Field of Classification Search
CPC ............. F02D 19/0649; F02D 19/0694; F02D 19/0689; F02D 19/0692; F02D 19/0615; F02M 43/04; F02M 61/14
See application file for complete search history.

(56) References Cited

U.S. PATENT DOCUMENTS 4,669,434 A * 6/1987 Okumura ............... F02B 31/085
123/188.14
6,332,448 B1 * 12/2001 Ilyama ................ F02D 19/0605
123/304
(Continued)

FOREIGN PATENT DOCUMENTS

JP 2010190072 A 9/2010
WO 2017123210 A1 7/2017

OTHER PUBLICATIONS

International Search Report and Written Opinion dated Sep. 25, 2019 pertaining to International application No. PCT/US2019/037439 filed Jun. 17, 2019, 14 pgs.

*Primary Examiner* — Joseph J Dallo
(74) *Attorney, Agent, or Firm* — Dinsmore & Shohl LLP

(57) ABSTRACT

According to one or more embodiments, an internal combustion engine may be operated by a method including one or more of the steps of passing a first fuel and a second fuel into a combustion chamber of an engine cylinder to form a fuel mixture, and combusting the fuel mixture with a spark plug to translate the piston housed in the engine cylinder and rotate a crank shaft coupled to the piston. The engine cylinder may include a cylinder head and cylinder sidewalls, and the combustion chamber may be defined at least partially by the cylinder head, the cylinder sidewalls, and the piston. The first fuel may include a greater octane rating than the second fuel. The combustion chamber may include an end gas region and a central region, the central region more near to the spark plug than the end gas region. The first fuel and second fuel may be passed into the combustion chamber such that the end gas region has a greater concentration of the first fuel than the central region, and the central region has a greater concentration of the second fuel than the end gas region.

18 Claims, 5 Drawing Sheets

(52) U.S. Cl.
CPC ..... *F02D 19/0692* (2013.01); *F02D 19/0694* (2013.01); *F02M 43/04* (2013.01); *F02M 61/14* (2013.01)

(56) References Cited

U.S. PATENT DOCUMENTS

| | | | |
|---|---|---|---|
| 7,121,254 B2 | 10/2006 | Wickman et al. | |
| 7,263,967 B2 * | 9/2007 | Hotta | C01B 3/22 |
| | | | 123/275 |
| 7,287,509 B1 | 10/2007 | Brehob | |
| 7,314,033 B2 * | 1/2008 | Cohn | F02B 47/04 |
| | | | 123/198 A |
| 7,721,703 B2 | 5/2010 | Kakuho et al. | |
| 2003/0028058 A1 | 2/2003 | Weissman et al. | |
| 2004/0060287 A1 * | 4/2004 | Campbell | F02B 27/04 |
| | | | 60/302 |
| 2008/0236546 A1 * | 10/2008 | Kakuho | F02B 17/005 |
| | | | 123/406.3 |
| 2008/0270004 A1 * | 10/2008 | Kuo | F02D 13/0203 |
| | | | 701/103 |
| 2012/0199100 A1 * | 8/2012 | Kamio | F02D 19/0671 |
| | | | 123/445 |
| 2014/0297162 A1 | 10/2014 | Surnilla et al. | |
| 2015/0052877 A1 | 2/2015 | Leone | |
| 2015/0240737 A1 | 8/2015 | Surnilla et al. | |
| 2016/0326973 A1 * | 11/2016 | Kurotani | F02D 41/0025 |
| 2017/0241351 A1 * | 8/2017 | Kurotani | F02D 19/0655 |
| 2017/0320498 A1 * | 11/2017 | Miller | B60W 10/06 |
| 2019/0017477 A1 * | 1/2019 | Hou | F02M 43/04 |

* cited by examiner

MULTI-FUEL INTERNAL COMBUSTION ENGINES AND METHODS FOR THEIR OPERATION

BACKGROUND

Field

The present disclosure relates to internal combustion engines and, more specifically, to internal combustion engines that utilize multiple fuels.

Technical Background

Petroleum-based fuels are used to power the vast majority of light-duty transportation vehicles, such as automobiles. For example, gasoline, which is relatively inexpensive and widely available for users, is utilized to power the internal combustion engines of automobiles throughout the world. However, the combustion of petroleum-based fuels may release carbon dioxide into the environment, which may be undesirable for a number of reasons. As other more clean sources of energy for use with transportation vehicles may be too costly and underdeveloped, engines are needed which can operate with petroleum-based fuels with increased efficiency, reduced fuel consumption, or both.

BRIEF SUMMARY

As disclosed herein, internal combustion engines which utilize multiple fuel types simultaneously may be utilized to lessen fuel consumption. According to embodiments presently described, internal combustion engines may utilize a low octane fuel source at relatively low and intermediate loads where the octane requirement of the engine is comparatively low, while additionally utilizing a high octane fuel (in a mixture with the low octane fuel) at high loads. Such operation may have greater fuel efficiency with varying engine loads, and may mitigate or eliminate knocking which would occur if the low octane fuel were utilized alone. By this method, a limited amount of high octane fuel may be leveraged to enable the engine to be more efficient in its use of the petroleum-based fuel (which may have considerably higher specific energy than commonly available high octane fuels such as methanol and ethanol). For example, in one or more embodiments described, a low octane fuel, such as a petroleum-derived fuel, is used in conjunction with a high octane fuel, such as an alcohol fuel.

However, while some superior results and efficiency may be achievable by the use of a high octane fuel along with a separate low octane fuel in a homogeneous mixture, engine knocking may be an issue under some conditions. However, it has been discovered that engine knocking can be reduced or even eliminated, according to one or more embodiments, when the high octane fuel and low octane fuel are directed to particular regions of the combustion chamber. In one or more embodiments, engine knocking may be reduced by injecting the high octane fuel into areas of the engine cylinder where fuel may be more susceptible to knocking. These regions, where fuel is more susceptible to knocking, may generally be in the areas furthest away from the spark plug. In order to reduce engine knocking, direct fuel injectors may be utilized which inject the high octane fuel into regions generally furthest away from the spark plug, such as near the low corners of the combustion chamber. According to some embodiments described presently, direct injectors may be utilized that inject the high octane fuel in a cone-shaped spray at a desired angle, which may disproportionately inject the high octane fuel into the areas relatively further away from the spark plug as compared to the low octane fuel, which may be injected more into the central region of the combustion chamber.

According to one or more embodiments, an internal combustion engine may be operated by a method comprising one or more of the steps of passing a first fuel and a second fuel into a combustion chamber of an engine cylinder to form a fuel mixture, and combusting the fuel mixture with a spark plug to translate the piston housed in the engine cylinder and rotate a crank shaft coupled to the piston. The engine cylinder may comprise a cylinder head and cylinder sidewalls, and the combustion chamber may be defined at least partially by the cylinder head, the cylinder sidewalls, and the piston. The first fuel may comprise a greater octane rating than the second fuel. The combustion chamber may comprise an end gas region and a central region, the central region more near to the spark plug than the end gas region. The first fuel and second fuel may be passed into the combustion chamber such that the end gas region has a greater concentration of the first fuel than the central region, and the central region has a greater concentration of the second fuel than the end gas region.

According to one or more additional embodiments, an internal combustion engine may be operated by a method comprising one or more of the steps of passing a first fuel and a second fuel into a combustion chamber of an engine cylinder to form a fuel mixture, and combusting the fuel mixture with a spark plug to translate the piston housed in the engine cylinder and rotate a crank shaft coupled to the piston. The engine cylinder may comprise a cylinder head and cylinder sidewalls, and the combustion chamber may be defined at least partially by the cylinder head, the cylinder sidewalls, and the piston. The first fuel may comprise a greater octane rating than the second fuel. The first fuel may be passed into the combustion chamber via direct injection in a conical spray pattern comprising a cone angle of from 55 degrees to 75 degrees relative to the cone axis when the injection is by a single hollow cone injector and a cone angle of from 35 degrees to 60 degrees relative to the cone axis when the injection is by a multiple solid cone injector.

According to one or more additional embodiments, an internal combustion engine may comprise an engine cylinder, a piston, a crank shaft, and a first direct injector. The engine cylinder may comprise a cylinder head and cylinder sidewalls. The piston may be housed within the engine cylinder, wherein the piston, the cylinder head, and the cylinder sidewalls may at least partially define a combustion zone. The crank shaft may be coupled with the piston. The first direct injector may be at the cylinder head and may pass at least a first fuel into the combustion chamber in a conical spray pattern comprising a cone angle relative to the cone axis. The first fuel and a second fuel may form a fuel mixture in the combustion zone. The first fuel may comprise a greater octane rating than the second fuel. The spark plug may combust the fuel mixture to translate the piston and rotate the crank shaft. Where the first direct injector is single hollow cone the cone angle may be from 55 degrees to 75 degrees, and where the first direct injector is multiple solid cone the cone angle may be from 35 degrees to 60 degrees.

Additional features and advantages of the technology disclosed in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
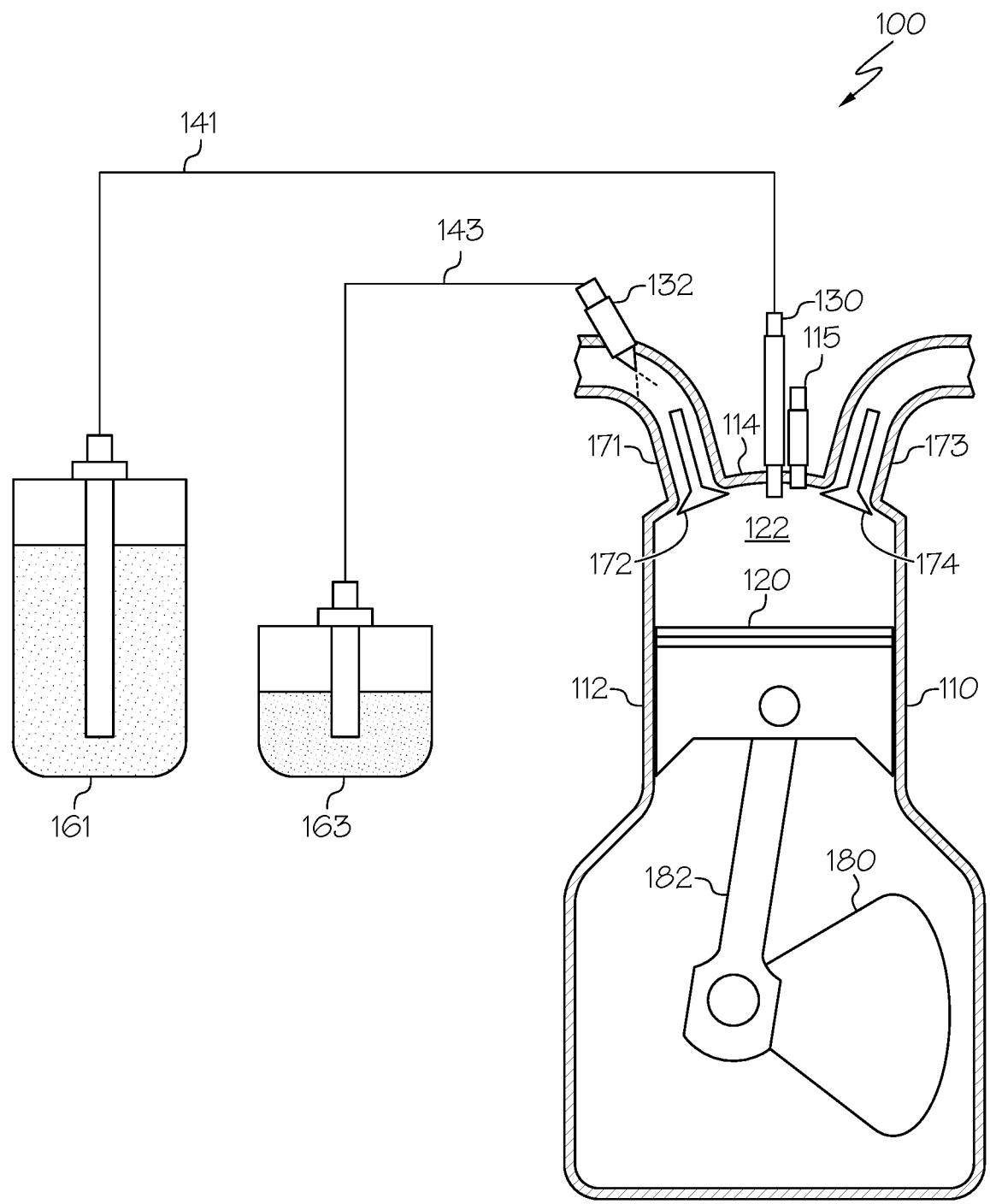
FIG. 1 schematically depicts a cross-sectional view of a portion of an engine cylinder of an internal combustion engine along with fuel sources, according to one or more embodiments described herein.

Described herein are internal combustion engines, and methods for the operation thereof, which utilize a combination of at least two fuels at all or some operating conditions. The engines, and methods for operating such engines, may positively influence both the engine operating conditions as well as the fuel properties so that knocking can be mitigated or eliminated. In one or more embodiments, the high octane fuel may be injected into regions of the combustion chamber which result in the end gas comprising a relatively greater amount of the high octane fuel. Such injection schemes, which cause the high octane fuel to be in the end gas, may also lead to a reduction in the amount of high octane fuel (such as, for example, alcohol) that may be needed to operate the engine without knocking.

It should be understood that, as described herein, "low octane fuel" may refer to any fuel which has a lower octane rating (or octane number) than the "high octane fuel." As such, unless specified, the low octane fuel and high octane fuel may have any octane number as long as the relationship between the two is satisfied. An octane rating, or octane number, is a standard measure of the performance of an engine or aviation fuel. The higher the octane number, the more compression the fuel can withstand before detonating (igniting). In broad terms, fuels with a higher octane rating may be used in high performance gasoline engines that require higher compression ratios. As described herein, the "octane number" refers to the research octane number (RON).

According to one or more embodiments, the low octane fuel may comprise a petroleum-based fuel, such as naphtha or gasoline. For example, the low octane fuel may comprise at least 50 wt. %, at least 60 wt. %, at least 70 wt. %, at least 80 wt. %, at least 90 wt. %, at least 95 wt. %, at least 99 wt. %, or even at least about 99.9 wt. % or naphtha, gasoline, or combinations thereof. The low octane fuel may have an octane number of 98 or less, 90 or less, or even 80 or less. In additional embodiments, the low octane fuel may have an octane number of from 60 to 98, such as from 91 to 95.

According to one or more embodiments, the high octane fuel may comprise one or more alcohols, such as methanol or ethanol, or methyl tert-butyl ether or ethyl tert-butyl ether. For example, the low octane fuel may comprise at least 50 wt. %, at least 60 wt. %, at least 70 wt. %, at least 80 wt. %, at least 90 wt. %, at least 95 wt. %, at least 99 wt. %, or even at least about 99.9 wt. % of total alcohols, methanol, ethanol, water, or a combination of any two or more of water, methanol, or ethanol, or other alcohol or ether. The high octane fuel may have an octane number of at least 91, at least 95, or even at least 98. In additional embodiments, the high octane fuel may have an octane number of from 91 and 130, such as from 105 to 115, such as 110.

As described herein, knocking in spark-ignition internal combustion engines may refer to an occurrence when combustion of the air/fuel mixture in the cylinder does not start off correctly in response to ignition by the spark plug, but one or more pockets of air/fuel mixture explode outside the envelope of the normal combustion front. The knocking phenomena may be mitigated or eliminated by the methods and engine configurations described herein.

Now Referring to FIG. 1, a schematic illustration of at least a portion of an internal combustion engine 100 is depicted. Specifically, FIG. 1 depicts a single engine cylinder 110 of an internal combustion engine 100. However, as is understood by those having skill in the art, an internal combustion engine 100 may comprise numerous engine cylinders, such as engine cylinder 110, which may be attached to one or more crank shafts, such as crank shaft 180 depicted in FIG. 1.

The internal combustion engine 100 may comprise at least an engine cylinder 110, an intake port 171, an exhaust port 173, and a piston 120. The intake port 171 may be regulated by an intake valve 172 positioned where the intake port 171 connects to the engine cylinder 110. Similarly, the exhaust port 173 may be regulated by an exhaust valve 174. The intake valve 172 and/or the exhaust valve 174 may be connected to one or more cams or camshafts (not depicted in FIG. 1) which may serve to keep the intake valve 172 and/or the exhaust valve 174 in time with the engine operation. The piston 120 may be coupled to a crank shaft 180 by connecting rod 182. The engine cylinder 110 may comprise a cylinder head 114 and cylinder sidewalls 112. The intake port 171 and the exhaust port 173 may be positioned on the cylinder head 114. Additionally, a direct injector and spark plug may be positioned on the cylinder head 114.

The volume defined on the top and sides by the engine cylinder 110 and on the bottom by the piston 120 is referred to as the combustion chamber 122. The intake port 171 and the exhaust port 173 are fluidly coupled with the combustion chamber 122 such that fluids may enter and exit the combustion chamber 122 at various times throughout the engine cycle. A spark plug 115 is positioned at the combustion chamber 122 to provide combustion initiation in timed bursts. The spark plug 115 may be positioned at or near the center of the combustion chamber 122 (for example, at or near the radial center with respect to the walls of the cylindrical-shaped engine cylinder 110).

According to the embodiment depicted in FIG. 1, a low octane fuel injector 132 may inject low octane fuel into the intake port 171, which will ultimately enter the combustion chamber 122. As described herein, a fuel injector which injects a fuel into the intake port 171 is referred to as a "port fuel injector." As depicted in FIG. 1, a high octane fuel injector 130 may inject high octane fuel directly into the combustion chamber 122. As described herein, a fuel injector which injects a fuel directly into the combustion chamber 122 is referred to as a "direct fuel injector." The low octane fuel injector 132 and the high octane fuel injector 130 may be supplied with respective fuels from a high octane fuel supply 161 and a low octane fuel supply 163. The high octane fuel supply 161 may be fluidly connected to the high octane fuel injector 130 via connection line 141. Similarly, the low octane fuel supply 163 may be fluidly connected to the low octane fuel injector 132 via connection line 143.

As is described in further detail, it should be understood that other injector configurations are contemplated, such as utilizing direct injection for both the high octane fuel and low octane fuel. The low octane fuel and high octane fuel may both be directly injected through the same direct fuel injector, or the low octane fuel and the high octane fuel may be directly injected via separate direct injectors.

The internal combustion engine 100 may operate by repeated combustion of a fuel mixture which comprises the high octane fuel and the low octane fuel. The combustion of the fuel mixture, commenced by the spark plug 155, may translate the piston 120 between an uppermost and lowermost position. The movement of the piston 120 may rotate the crank shaft 180. The crank shaft 180 may rotate though a top dead center position (corresponding to the uppermost position of the piston 120) and a bottom dead center position (corresponding to the lowermost position of the piston 120). In one or more embodiments, the internal combustion engine may operate as a four stroke engine, although other engine configurations are contemplated. In such an embodiment, intake, compression, power, and exhaust strokes may cycle. In the intake stroke, the piston may move downward and air and/or fuel may enter the combustion chamber 122 through the intake port 171. In the compression stroke, the air and fuel are compressed as the piston 120 moves upward. In the power stroke, the piston is forced downward by combustion, which is caused by a spark from the spark plug 115. The optimal combustion timing (by ignition of the spark plug) based on utilizing the maximum thermal efficiency of a given engine is referred to as the maximum brake torque timing. In the exhaust stroke, the piston moves upwardly to force exhaust gases (products of the combustion reaction) out of the combustion chamber 122 through the exhaust port 173.

According to one or more embodiments, the internal combustion engine 100 may operate by utilizing only the low octane fuel while running at relatively low loads. The internal combustion engine 100 may utilize the mixture of the high octane fuel and the low octane fuel at greater loads. For example, at low engine loads, gasoline may be sufficient for operation, while at higher engine loads, alcohol may be needed as an additive to increase the octane rating of the fuel that is combusted. The separate fuel injectors 130, 132 for the high octane fuel and low octane fuel may allow for on-demand injection of high octane fuel at some operating conditions while utilizing only the low octane fuel at other operating conditions.

Figure 2:
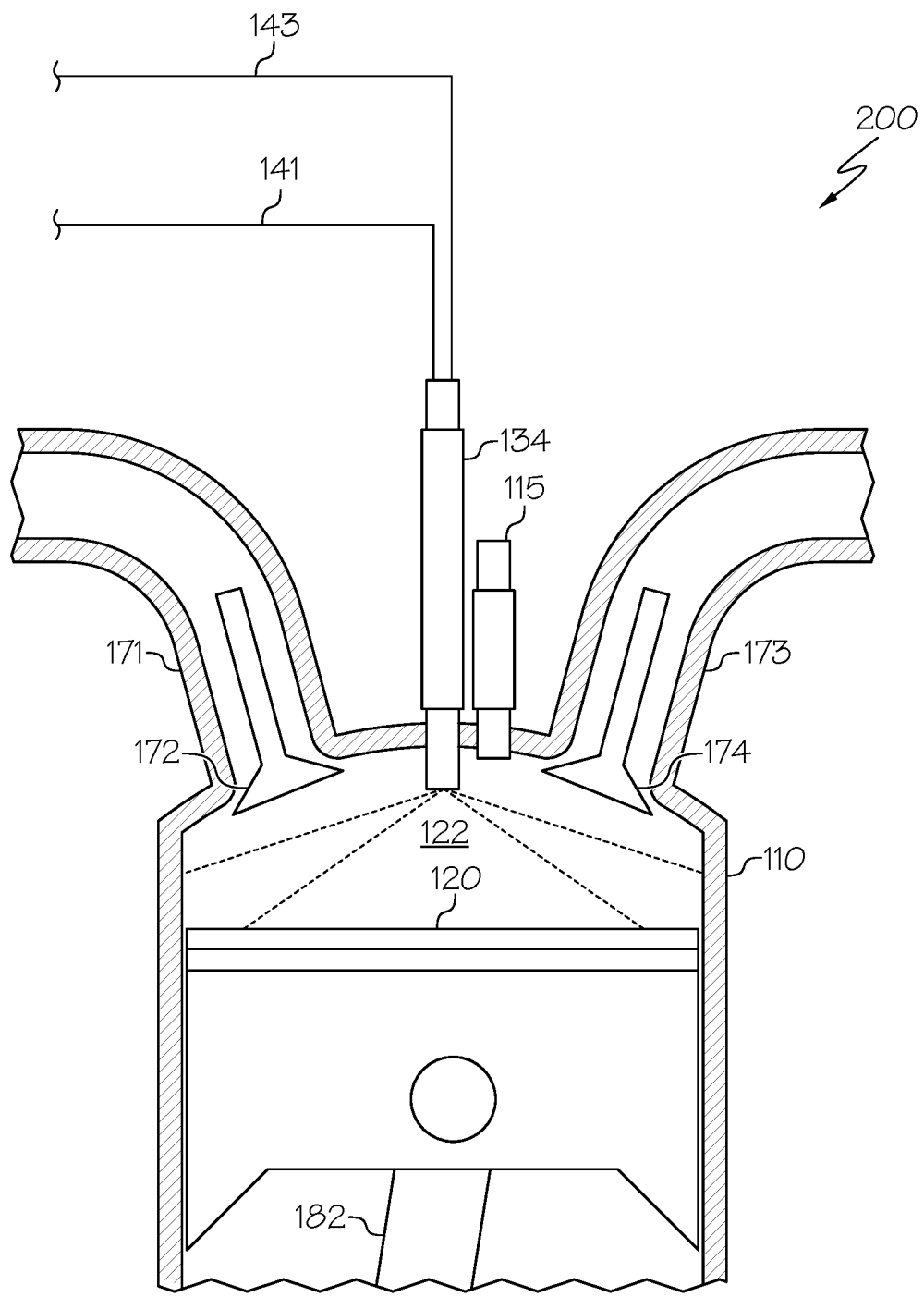
FIG. 2 schematically depicts a cross-sectional view of a portion of a cylinder of an internal combustion engine having direct injection of the high octane fuel and direct injection of the low octane fuel through a single, shared direct injector, according to one or more embodiments described herein.
Figure 3:
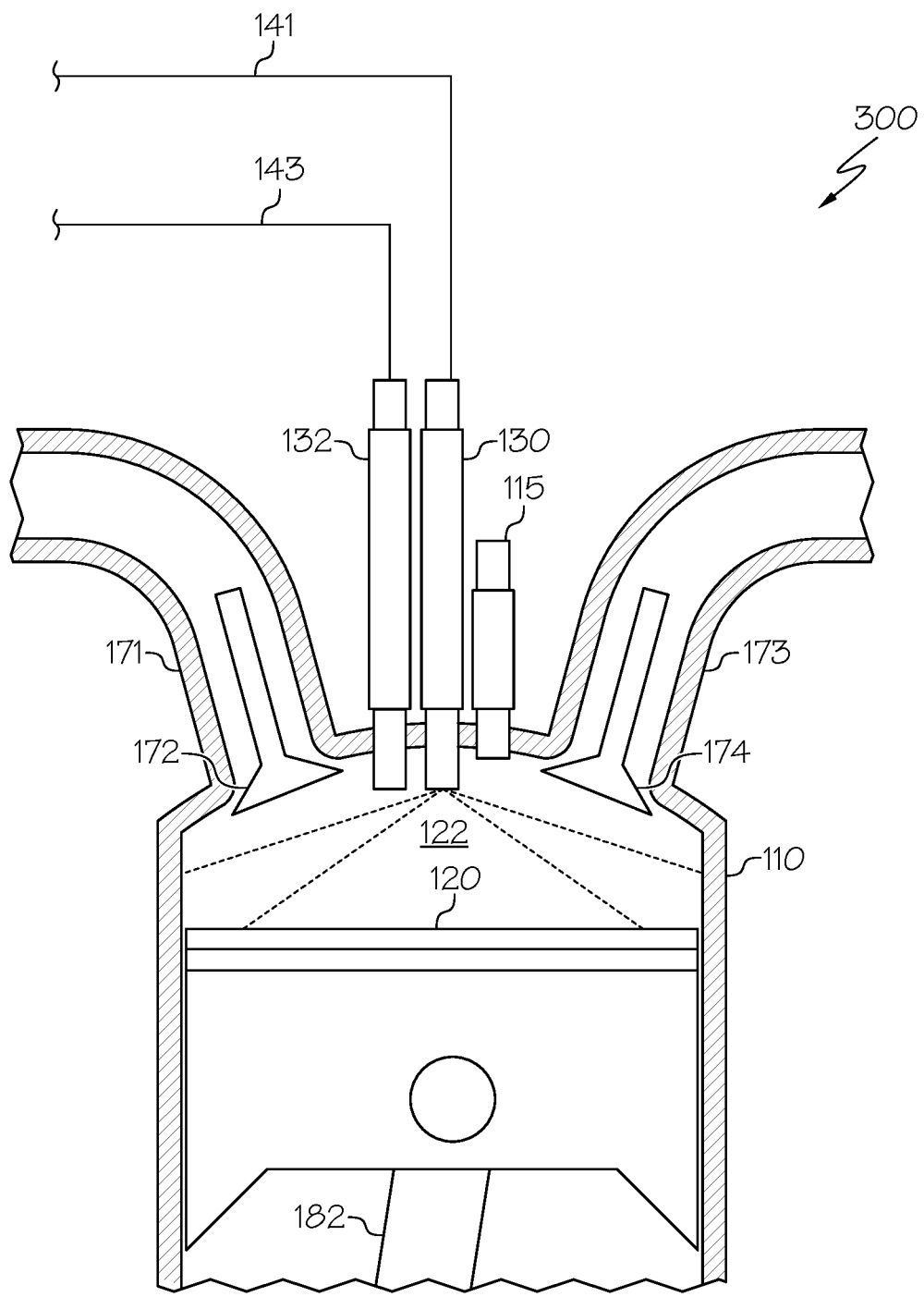
FIG. 3 schematically depicts a cross-sectional view of a portion of a cylinder of an internal combustion engine having direct injection of a high octane fuel and direct injection of the low octane fuel through different injectors, according to one or more embodiments described herein.
Figure 4:
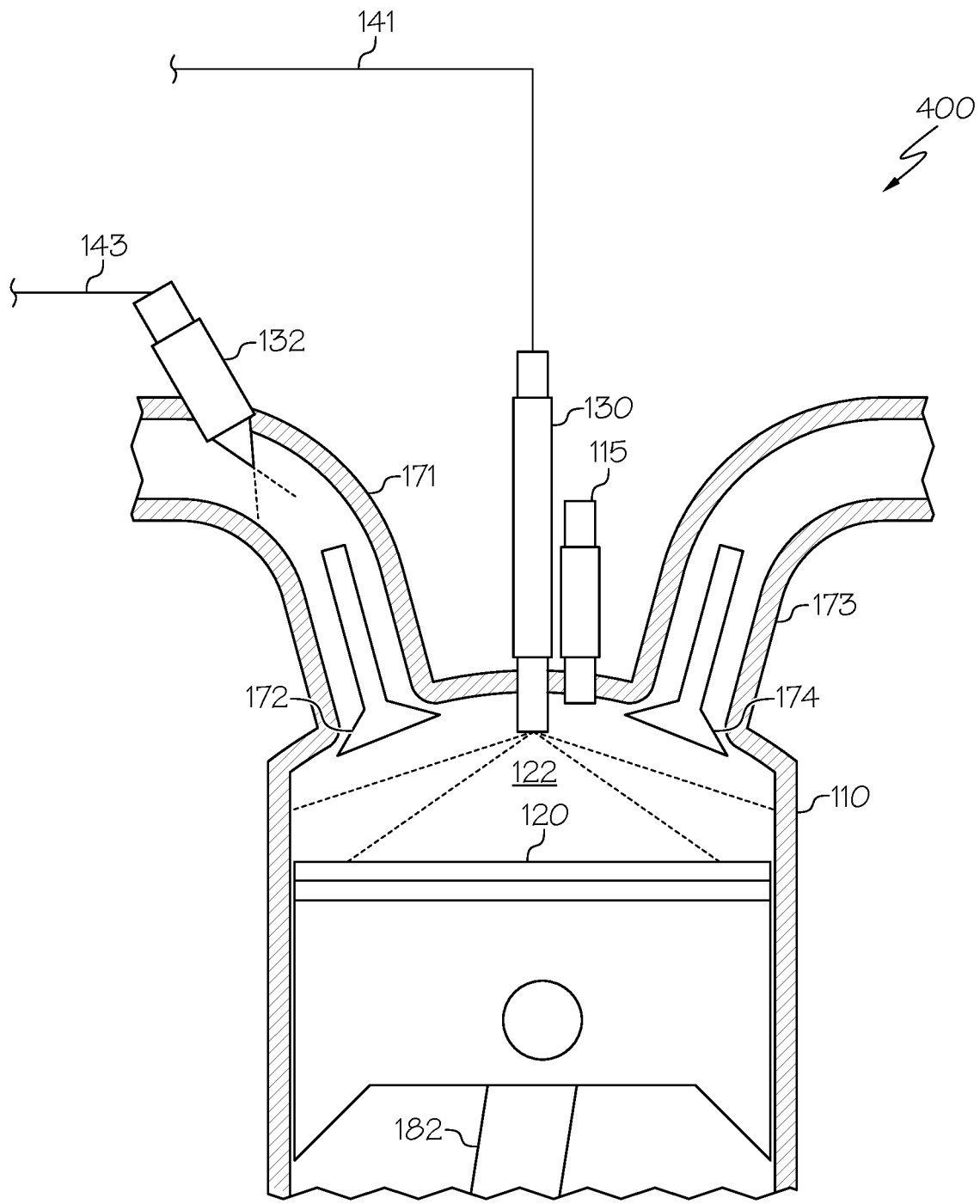
FIG. 4 schematically depicts a cross-sectional view of a portion of a cylinder of an internal combustion engine having direct injection of the high octane fuel and port injection of the low octane fuel, according to one or more embodiments described herein.

Without limitation, several fuel delivery configurations are contemplated and illustrated in FIGS. 2-4, where in each of FIGS. 2-4 the piston 120 is moving upwardly in the compression stroke while fuels are being injected into the combustion chamber 122. In one embodiment, depicted in FIG. 2, a combined fuel injector 134 may be a direct injector which feeds high octane fuel as well as low octane fuel into the combustion chamber 122. FIG. 3 depicts another embodiment, where both the high octane fuel injector 130 and the low octane fuel injector 132 are direct injectors. FIG. 3 depicts an additional embodiment where the high octane fuel injector is a direct injector and the low octane fuel injector 132 is an indirect injector (as is shown in the embodiment of FIG. 1). In each embodiment, the high octane fuel may be injected into the combustion chamber 122 in or around the end gas regions of the combustion chamber 122. In some embodiments, the high octane fuel may be injected in a conical spray pattern where the cone angle may be from 55 degrees to 75 degrees or from 35 degrees to 60 degrees. As described herein, the "cone angle" refers to the angle of conical spray relative to a line parallel to the sidewalls 112 of and generally perpendicular to the top surface of the piston 120 (that is, a vertical line in any of FIGS. 1-5). This line may be referred to as the cone axis. That is, the angle formed by the cross-section of the sprayed cone would be double that of the "cone angle". The conical spray is generally "hollow" such that spray is absent or minimized in the area of the cone axis.

Figure 5:
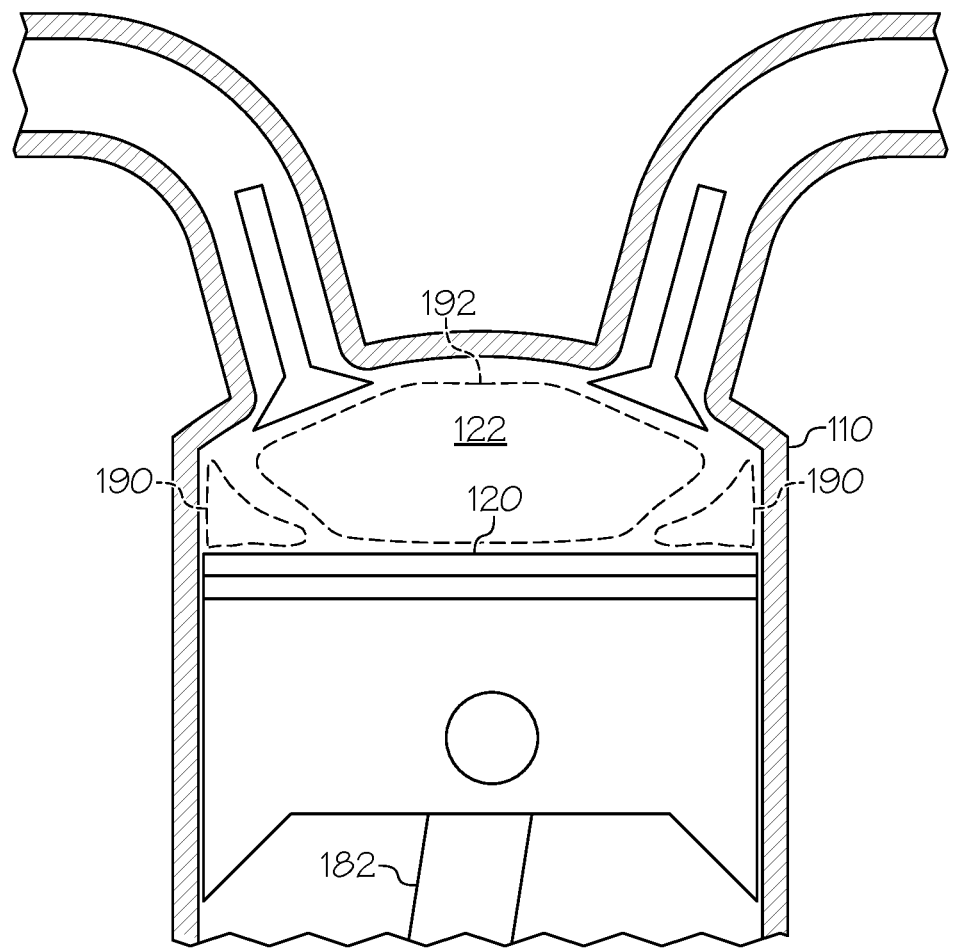
FIG. 5 schematically depicts a cross-sectional view of a portion of a cylinder of an internal combustion engine which shows the generalized areas of the cylinder that constitute its central region and its end gas region, according to one or more embodiments described herein.

Now referring to FIG. 5, according to one or more embodiments, the combustion chamber 122 may comprise a central region 192 and an end gas region 190. The end gas region 190 is the region of the combustion chamber 122 which contains the last fuel that is combusted by normal combustion of the engine (that is, combustion actuated by the spark plug). FIG. 5 provides an example of an end gas region 190 for one particular engine geometry. However, the end gas region 190 may be different based on engine geometry and operation. As show in FIG. 5, in one or more embodiments, the end gas region 190 may be positioned furthest away from the spark plug that is located in a generally central area of the combustion chamber 122 on the cylinder head 114. The areas at or near the corners of the combustion chamber 122 may be defined by the edge of the piston 120 and the sidewalls 112. The end gas region 190 may be ring-shaped and positioned around the bottom of the combustion chamber 122 (that is, at or near the piston 120 and/or the sidewall 112). It should be understood that FIG. 5 generally depicts a location of an example of an end gas region and a central region of an engine cylinder, and is applicable with at least any of the injector configurations of FIGS. 2-4.

According to one or more embodiments, the high octane fuel and low octane fuel may be passed into the combustion chamber 122 such that the end gas region 190 has a greater concentration of high octane fuel than the central region 192, and the central region 192 has a greater concentration of low octane fuel than the end gas region 190. In such an embodiment, the fuel mixture in the combustion chamber 122 may be "heterogeneous" where, on average, more of the high octane fuel is in or near the end gas region 190 and more of the low octane fuel is in the central region 192 when passed into the combustion chamber 122. Such a configuration may allow, on average, the low octane fuel to be combusted prior to the high octane fuel.

Without being bound by any particular theory, it is believed that according to some embodiments presently disclosed, due to the relatively high latent heat of evaporation of the high octane fuel, the liquid penetration length of the high octane fuel jets may be greater than that of a regular gasoline fuel and may therefore maximize the quantity of liquid fraction reaching the end gas. The end gas may then be locally cooled by evaporation of the high octane fuel to such a temperature that it requires less high octane fuel than if it had been mixed during the intake stroke in a homogeneous manner. It is also believed that the locally high concentration of high octane fuel in the end gas region prevents the end gas from experiencing auto-ignition, thus allowing enough time for the flame to reach that region and consume the fuel/air mixture in a controlled mode. By the methods and apparatuses presently disclosed, knock control in the octane on demand concept may be achieved while minimizing the consumption of the high octane fuel.

In one or more embodiments, the high octane fuel may be directly injected into the combustion chamber 122 in a conical spray pattern, wherein the cone angle is from 55 degrees to 75 degrees for a single hollow cone injector and from 35 degrees to 60 degrees for a multiple solid cone injector. This conical spray pattern at the specified angle may cause the high octane fuel to be injected into the end gas region 190 of the combustion chamber 122. In these embodiments, the low octane fuel may be generally injected into the central portion 192 of the combustion chamber 122.

As presently described, a "single hollow cone injector" may refer to an injector which dispenses fuel in a conical spray pattern through a single hole or nozzle. The spray pattern results in a cone shaped spray that is hollow since spray is not directed into the interior of the cone and originates from a single hole in the injector.

Additionally, as presently described, a "multi solid cone injector" may refer to an injector which utilizes multiple holes or nozzles to form a hollow cone shaped spray, where each hole or nozzle sprays out a solid and relatively narrow cone-shaped spray pattern. The combination of the multiple narrow, solid cones of spray forms a conical spray pattern shown in, for example, FIGS. 2-4. In such embodiments, each smaller solid cone spray forms a portion of the conical spray pattern of the injector, thus forming a cone spray which is overall hollow in shape.

As would be appreciated by one having skill in the art, a single hollow cone injector may have a shorter liquid length penetration in the combustion chamber 122 as compared with a multiple solid cone injector, such as an injector which shoots out multiple "solid cone" sprays to form a conical spray pattern. Therefore, according to some embodiments, a single hollow cone injector may utilize a wider cone angle (than a multiple solid cone injector) to reach the desired cylinder region (for example, the end gas region) while multiple solid cone injectors may penetrate further into the combustion chamber 122 and therefore may desirably utilize a more narrow spray angle range. As such, according to various embodiments presently disclosed, the penetration length of the injector may be a factor in determining the desired spray angle to reach the end gas region.

In various embodiments which may utilize a single hollow cone injector, the high octane fuel may be sprayed into the combustion chamber 122 in a conical pattern where the cone angle is from 55 degrees to 57.5 degrees, from 57.5 degrees to 60 degrees, from 60 degrees to 62.5 degrees, from 62.5 degrees to 65 degrees, from 65 degrees to 67.5 degrees, from 67.5 degrees to 70 degrees, from 70 degrees to 72.5 degrees, from 72.5 degrees to 75 degrees, or any combination thereof. It should be understood that the conical spray may spray in a generally thin, linear direction, but may have a spray thickness over several degrees, such as less than 10 degrees, less than 5 degrees, less than 3 degrees, or even less than 1 degree. As described presently, the cone angle should be understood as the angular measurement between the middle portions of the spray stream and the cone axis. In other embodiments, the conical spray may be broad, such as the entire or a substantial portion of the 55 degree to 75 degree range.

According to one or more embodiments, the cone angle for a single hollow cone injector may be from 55 degrees to 57.5 degrees, from 55 degrees to 60 degrees, from 55 degrees to 62.5 degrees, from 55 degrees to 65 degrees, from 55 degrees to 67.5 degrees, from 55 degrees to 70 degrees, or from 55 degrees to 72.5 degrees. In additional embodiments, the cone angle may be from 57.5 degrees to 75 degrees, from 60 degrees to 75 degrees, from 62.5 degrees to 75 degrees, from 65 degrees to 75 degrees, from 67.5 degrees to 75 degrees, from 70 degrees to 75 degrees, or from 72.5 degrees to 75 degrees.

In additional embodiments which utilize a multiple solid cone injector, the high octane fuel may be directly injected into the combustion chamber 122 in a conical spray pattern, wherein the cone angle is from 35 degrees to 60 degrees. This conical spray pattern at the specified angle may cause the high octane fuel to be injected into the end gas region 190 of the combustion chamber 122. According to one or more embodiments, this spray angle may be utilized for a multiple solid cone injector. In these embodiments, the low octane fuel may be generally injected into the central portion 192 of the combustion chamber 122. In various embodiments, the high octane fuel may be sprayed into the combustion chamber 122 in a conical pattern where the cone angle is from 35 degrees to 40 degrees, from 40 degrees to 50 degrees, from 50 degrees to 55 degrees, from 55 degrees to 60 degrees, or any combination thereof. It should be understood that the conical spray may spray in a generally thin, linear direction, but may have a spray thickness over several degrees, such as less than 10 degrees, less than 5 degrees, less than 3 degrees, or even less than 1 degree.

According to one or more embodiments, the cone angle for a multiple solid cone injector may be from 35 degrees to 40 degrees, from 35 degrees to 45 degrees, from 35 degrees to 50 degrees, from 35 degrees to 55 degrees, from 40 degrees to 60 degrees, from 45 degrees to 60 degrees, or from 50 degrees to 60 degrees, or from 55 degrees to 60 degrees.

It should be understood that while particular spray angles are disclosed, the spray angle may depend upon the geometry and timing of the engine, such as the cylinder and piston diameter and the injection timing. However, the angles presently disclosed may be suitable for some common cylinder sizes and shapes which are utilized for internal combustion engines. For example the difference is spray angles for a multiple solid cone injector and a single hollow cone injector may be due to the differences in timing of injection when these varying control types are utilized. In general, the embodiments described presently utilized a wider spray angle than would normally be utilized in an internal combustion engine operating on gasoline or a mixture of gasoline and alcohols. As such, it should be understood that where certain figures and description included herewith show spray angles of from 55 degrees to 75 degrees, a spray angle of from 35 degrees to 60 degrees may be suitable in other engine configurations.

Referring now again to FIGS. 2-4, the conical spray pattern for the direct injection of the high octane fuel can be achieved in the various embodiments. For example, according to the embodiments of FIGS. 2-4, the high octane fuel may be passed into the combustion chamber 122 via direct injection through the cylinder head 114 in a conical spray pattern of from 55 degrees to 75 degrees (or any disclosed subrange thereof). The spray angle of the high octane fuel may pass the high octane fuel into the end gas regions of the combustion chamber 122. It should be understood that the dashed spray lines of FIGS. 2-4 represent the outer bounds of the spray angle, and that the entire area between these dashed lines need not be part of the spray. According to various embodiments contemplated presently, the conical spray formation may be achieved by direct injection valves, sprayers, faucets, spigots, sprinklers, atomizers, et cetera, which can supply a conical spray.

As shown in the embodiment of FIG. 2, the high octane fuel may be passed through the combined fuel injector 134. The combined fuel injector 134 may also directly inject the low octane fuel with a more narrow conical spray pattern, or in a non-conical pattern and into the central region of the combustion chamber 122. For example, the low octane fuel may be injected with a cone angle of less than 55 degrees. Moreover, other spray patterns for the low octane fuel are contemplated that inject the low octane fuel into the central region of the combustion chamber 122. The low octane fuel and the high octane fuel may be injected at different times through the combined fuel injector 134. For example, the combined fuel injector 134 may include two inlets (one for each fuel) and either one or two outlets. In the case of a single outlet, both fuels exit the same outlet at different times. In the case of a dual outlet, each fuel may have its own outlet. For the case of a multi solid cone injector where each fuel has its own outlet, the injector may have a first plurality of nozzles for the low octane fuel and a second plurality of nozzles for the high octane fuel. For the case of a single hollow cone injector where each fuel has its own outlet, the low octane fuel and high octane fuel may each, respectively, have a single nozzle.

As shown in the embodiment of FIG. 3, the high octane fuel may be passed through the high octane fuel injector 130 via direct injection. The low octane fuel injector 132 may directly inject the low octane fuel with a more narrow conical spray pattern. For example, the low octane fuel may be injected via the low octane fuel injector 132 with a cone angle of less than 55 degrees. Moreover, other spray patterns are contemplated for the low octane fuel that injects the low octane fuel into the central region of the combustion chamber 122. In such an embodiment, the low octane fuel and the high octane fuel may be injected at different times or simultaneously.

As shown in the embodiment of FIG. 4, the high octane fuel may be passed through the high octane fuel injector 130 via direct injection. The low octane fuel injector 132 may indirectly inject the low octane fuel through the intake port 171. Indirect injection through the intake port 171 may pass the low octane fuel into the central region of the combustion chamber 122. In such an embodiment, the low octane fuel and the high octane fuel may be injected at different times or simultaneously.

It is contemplated that either a multi solid cone injector or a single hollow cone injector may be utilized with any of the embodiments presently disclosed. As discussed previously in this disclosure, the spray angle may be altered based on the type of injector utilized.

In one or more embodiments, the engine may be operated with a mixed fuel that has at or near the minimum octane rating needed to prevent knocking at the CA50 utilized for engine operation. That is, for a given CA50 engine timing, an appropriate amount of high octane fuel may be combined with a remainder of low octane fuel to provide a mixed fuel with sufficient octane number such that knocking does not occur. For the operational CA50 (the CA50 at which the engine is operated), the minimum octane rating of the fuel mixture may be determined based on experimentation. Based on the octane number of the high octane fuel and the low octane fuel used, the minimum weight percent of high octane fuel needed to prevent knocking at the operational CA50 can be determined. In one or more embodiments, the engine may be operated with a weight percentage of high octane fuel which is within 20 wt. %, within 15 wt. %, within 10 wt. %, within 5 wt. %, within 2 wt. %, or even within 1 wt. % of this minimum weight percentage needed to prevent engine knocking. However, it should be understood that utilizing the heterogeneous fuel mixture as presently described may allow for a comparatively reduced amount of high octane fuel to be used without engine knocking.

As presently described, a CA50 may be defined as the crank angle at which 50 wt. % of the fuel mass has been burned and is defined with respect to the top dead center (TDC) position of the piston unless otherwise specified. The CA50 may be representative of the timing of the spark ignition of the combustion in the engine. That is, the timing of the spark may determine the CA50. For each engine configuration and operating conditions a maximum brake torque CA50 can be determined, which is the CA50 at which maximum thermal efficiency of the engine is utilized.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the appended claims should be taken as the sole representation of the breadth of the present disclosure and the corresponding scope of the various embodiments described in this disclosure. Further, it should be apparent to those skilled in the art that various modifications and variations can be made to the described embodiments without departing from the spirit and scope of the claimed subject matter. Thus it is intended that the specification cover the modifications and variations of the various described embodiments provided such modifications and variations come within the scope of the appended claims and their equivalents.

As used in the specification and appended claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

Where a range of values is provided in the Specification or in the appended Claims, it is understood that the interval encompasses each intervening value between the upper limit and the lower limit as well as the upper limit and the lower limit. The invention encompasses and bounds smaller ranges of the interval subject to any specific exclusion provided.

What is claimed is:

1. A method of operating an internal combustion engine, the method comprising:

passing a first fuel and a second fuel into a combustion chamber of an engine cylinder to form a fuel mixture, the engine cylinder comprising a cylinder head and cylinder sidewalls, wherein the first fuel comprises a greater octane rating than the second fuel, and wherein the combustion chamber is defined at least partially by the cylinder head, the cylinder sidewalls, and a piston; and combusting the fuel mixture with a spark plug to translate the piston Housed in the engine cylinder and rotate a crank shaft coupled to the piston;

wherein:

the combustion chamber comprises an end gas region and a central region, the central region more near to the spark plug than the end gas region;

the first fuel and second fuel are passed into the combustion chamber such that the end gas region has a greater concentration of the first octane fuel than the central region, and the central region has a greater concentration of second octane fuel than the end gas region.

2. The method of claim 1, wherein the first fuel and the second fuel form a fuel mixture that is a heterogeneous mixture.

3. The method of claim 1, wherein, on average, the second fuel is combusted before the first fuel is combusted.

4. The method of claim 1, wherein the first fuel is passed into the combustion chamber via direct injection in a conical spray pattern.

5. The method of claim 1, wherein the first fuel and the second fuel are directly injected through a combined fuel injector.

6. The method of claim 1, wherein the first fuel is directly injected by a first direct injector and the second fuel is directly injected by a second direct injector.

7. The method of claim 1, wherein the first fuel is directly injected by a direct injector and the second fuel is indirectly injected by an indirect injector.

8. A method of operating an internal combustion engine, the method comprising:

passing a first fuel and a second fuel into a combustion chamber of an engine cylinder to form a fuel mixture, the engine cylinder comprising a cylinder head and cylinder sidewalls, wherein the first fuel comprises a greater octane rating than the second fuel, and wherein the combustion chamber is defined at least partially by the cylinder head, the cylinder sidewalls, and a piston; and combusting the fuel mixture with a spark plug to translate the piston Housed in the engine cylinder and rotate a crank shaft coupled to the piston;

wherein:

the first fuel is passed into the combustion chamber via direct injection by a single hollow cone fuel injector in a conical spray pattern comprising a cone angle of from 55 degrees to 75 degrees relative to the cone axis; or the first fuel is passed into the combustion chamber via direct injection by a multiple solid cone fuel injector in a conical spray pattern comprising a cone angle of from 35 degrees to 60 degrees relative to the cone axis; and the second fuel is passed into the combustion chamber via direct injection at a cone angle that is less than the cone angle of the first fuel, such that that an end gas region of the combustion chamber has a greater concentration of the first fuel than a central region of the combustion chamber.

9. The method of claim 8, wherein the first fuel and the second fuel are directly injected through a combined fuel injector.

10. The method of claim 8, wherein the first fuel is directly injected by a first direct injector and the second fuel is directly injected by a second direct injector.

11. The method of claim 8, wherein the first fuel and the second fuel form a fuel mixture that is a heterogeneous mixture.

12. The method of claim 8, wherein, on average, the second fuel is combusted before the first fuel is combusted.

13. An internal combustion engine comprising:

an engine cylinder comprising a cylinder head and cylinder sidewalls;

a piston housed within the engine cylinder, wherein the piston, the cylinder head, and the cylinder sidewalls at least partially define a combustion chamber;

a crank shaft coupled with the piston;

a first direct injector at the cylinder head which passes at least one of a first fuel and a second fuel into the combustion chamber in a conical spray pattern comprising a cone angle relative to the cone axis, wherein the first fuel and the second fuel form a fuel mixture in the combustion chamber, and wherein the first fuel comprises a greater octane rating than the second fuel, wherein:

the first direct injector is a single hollow cone injector and the cone angle is from 55 degrees to 75 degrees; or the first direct injector is a multiple solid cone injector and the cone angle is from 35 degrees to 60 degrees;

the second fuel is passed into the combustion chamber via direct injection at a cone angle that is less than a cone angle of the first fuel, such that that an end gas region of the combustion chamber has a greater concentration of the first fuel than a central region of the combustion chamber; and a spark plug that combusts the fuel mixture to translate the piston and rotate the crank shaft.

14. The internal combustion engine of claim 13, wherein the central region of the combustion chamber is more near to the spark plug than the end gas region, and wherein the first direct injector passes the first fuel into the end gas region.

15. The internal combustion engine of claim 13, wherein the first direct injector is a combined fuel injector that injects the first fuel and the second fuel into the combustion chamber.

16. The internal combustion engine of claim 13, further comprising a second direct injector that injects the second fuel into the combustion chamber.

17. The internal combustion engine of claim 13, wherein the first direct injector is a single hollow cone injector comprising a single nozzle through which the entirety of the first fuel passes.

18. The internal combustion engine of claim 13, wherein the first direct injector is a multiple solid cone injector comprising multiple nozzles through which the first fuel passes.

* * * * *